J. F. METTEN.
APPARATUS FOR THE BALANCING OF ROTATABLE BODIES.
APPLICATION FILED MAR. 12, 1909.
1,047,677.
Patented Dec. 17, 1912.
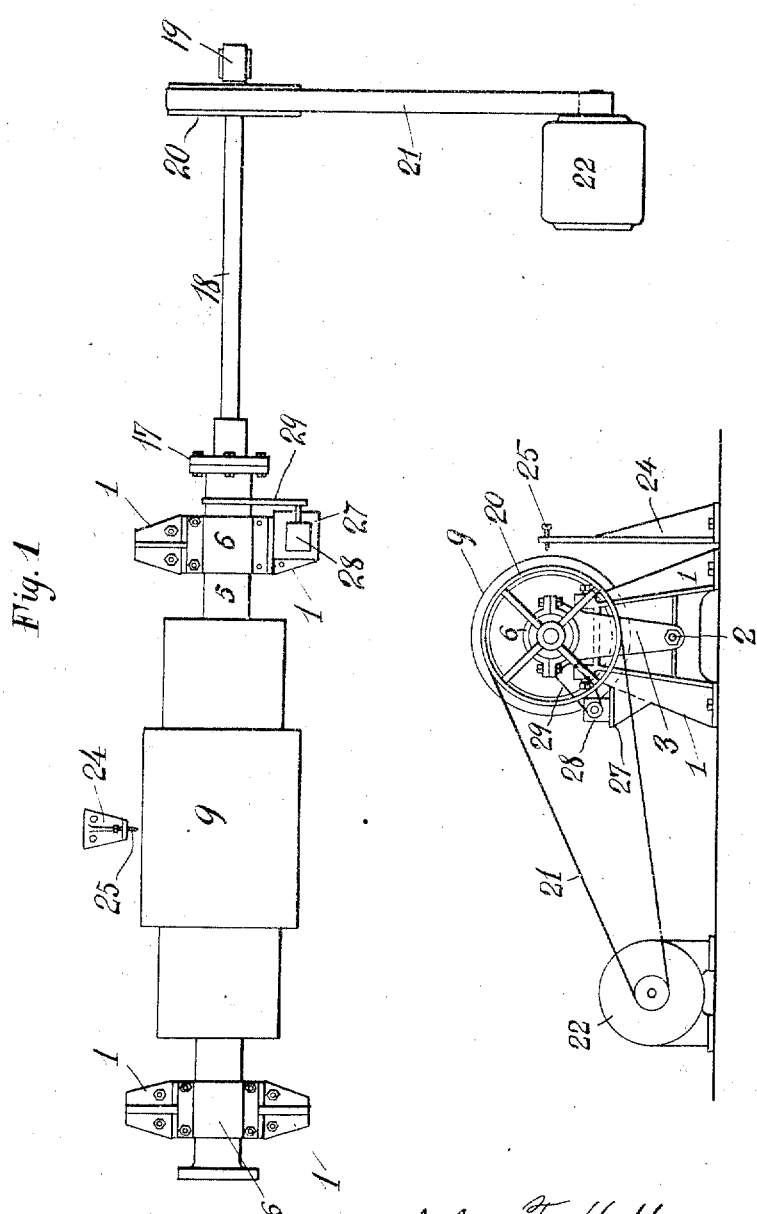

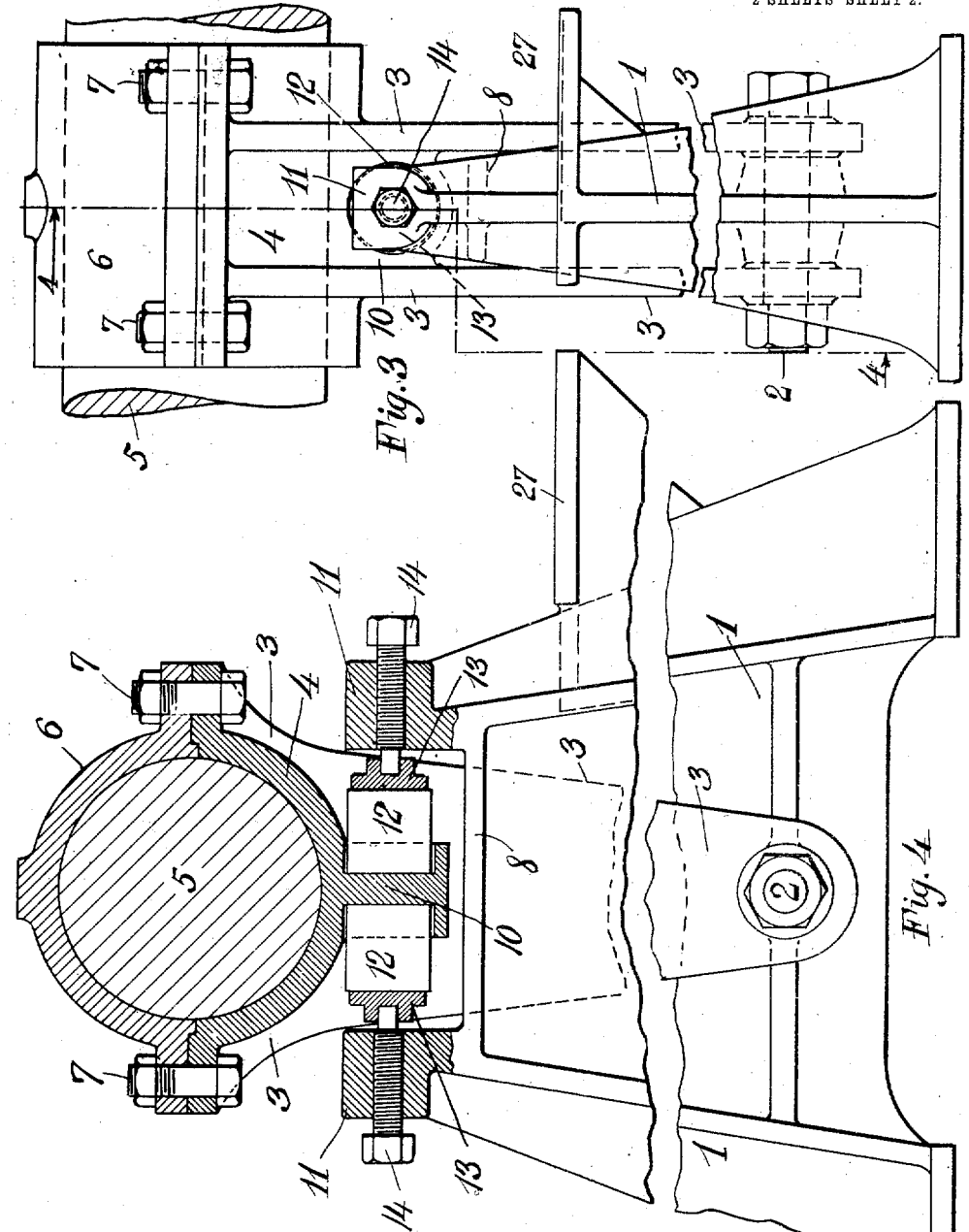

UNITED STATES PATENT OFFICE.

JOHN F. METTEN, OF PHILADELPHIA, PENNSYLVANIA, ASSIGNOR TO WM. CRAMP & SONS SHIP & ENGINE BUILDING COMPANY, A CORPORATION OF PENNSYLVANIA.

APPARATUS FOR THE BALANCING OF ROTATABLE BODIES.

1,047,677.  Specification of Letters Patent.  Patented Dec. 17, 1912.

Application filed March 12, 1909. Serial No. 482,914.

*To all whom it may concern:*

Be it known that I, JOHN F. METTEN, a citizen of the United States, residing at Philadelphia, in the county of Philadelphia and State of Pennsylvania, have invented certain new and useful Improvements in Apparatus for the Balancing of Rotatable Bodies, of which the following is a full, clear, and exact specification.

This invention relates to apparatus for the balancing of rotatable bodies, and more particularly has reference to apparatus for determining the amount and location of weights necessary to be added or removed in order to dynamically balance the rotors for elastic fluid turbines.

The rotors of elastic fluid turbines are commonly built up of a large number of bucket wheels, fixed on the shaft, which may vary in diameter according to their position. When such a rotor carrying dissimilar elements is assembled, it is necessary that is should be balanced, so as to rotate at high speeds without vibration, and if not, to change the disposition of weight so that it will rotate perfectly true without any oscillation at high speeds.

It is the object of this invention to provide apparatus whereby the balance of a turbine rotor may be determined readily and cheaply without the necessity of mounting the rotor in the casing and running it under steam pressure experimentally a number of times before the balance is determined. This object I attain by the apparatus hereinafter described, consisting in mounting the rotor to be balanced in a balancing apparatus comprising bearing supports arranged to have a limited degree of movement, and mechanically driving the rotor by a motor at such speeds as to cause vibration of the rotor in the movable supports if the rotor is not balanced. By marking the rotor or the shaft at points of eccentricity, disposition of weights can be varied according to these markings until the vibrations are eliminated and the rotor runs perfectly true at any speed. By this method, a rotor can be accurately balanced before it is put in the casing, and without driving it by steam, thereby avoiding the trouble and expense of mounting and dismounting the rotor in the casing while adjusting its balance and also enabling a more accurate balance to be obtained.

In the accompanying drawings, a form of apparatus embodying the invention is shown, wherein, Figure 1 is a plan view of an apparatus embodying the invention, Fig. 2 is an end view, Fig. 3 is a side elevation, on an enlarged scale, of one of the movable rotor bearings, and Fig. 4 is an elevation, partly in section, on the line 4—4 of Fig. 3, of one of the rotor bearings.

1, 1, represent generally U-shaped upright supports adapted to be secured to a floor, and pivoted thereon at 2 is an upwardly extending hanger 3 carrying at its other end a bearing 4 adapted to receive the rotor shaft, which is held therein by an upper cap 6 removably secured thereto by bolts 7. The hanger 3 preferably is guided by bridge pieces 8 carried by the uprights 1, so as to prevent longitudinal swaying of the rotor shaft. 9 is the rotor proper. The hanger 3 is provided with a projecting rib or lug 10, and interposed between this lug 10, and the ends 11 of the supports, are resilient cushions 12 which are preferably provided with bearing plates 13 engaged by screws 14 threaded into the supports 1. By this means the amount of resistance the cushions 12 will offer to vibration of the shaft hanger 3 will be controlled. A similar provision is made for each end of the rotor shaft 5, and at one end is coupled by coupling 17, a somewhat flexible driving shaft 18 supported in a bearing 19 and having a driving pulley 20, which is driven through a belt 21 from an electric motor 22, controlled in any suitable manner to go in either direction.

24 is a bracket mounted adjacent the rotor and carrying a pencil or other marking device 25 adjustable toward and from the periphery of the rotor so as to make a mark thereon when brought into contact. Several of these may be used disposed at different points along the rotor, if desired.

27 represents a bracket on which a tachometer 28 may be placed and be driven by bolt 29 from the rotor shaft 5, to permit the rotor to be driven at definite speeds relatively to its designed speeds.

The shaft 5 carrying the rotor 9 is placed in the movable bearings 3 and is rotated by the motor 22 at any desired speed. If the rotor is not balanced, the resultant centrifugal force developed in it will cause the rotor to vibrate bodily in its movable supports, on the pivot 2 and against the opposition of the elastic abutments 12. The speed of rotation is made such that a distinct vibration is produced and the pencil or other marking devices 25 are so adjusted that the shaft is marked at points of eccentricity. The point upon the shaft at which the mark is made at ordinary speeds is approximately in the radius containing the excess weight which causes the vibration. The unbalanced portion having been thus determined, it will be apparent that the condition of balance may be approached by removing weight from the rotor upon the side of the axis where the mark is located, or by increasing the weight upon the opposite side, either operation tending to shift the dynamic center of mass closer to the axis of rotation. When they are coincident balance is of course attained. Weight having been added or subtracted as described, the rotor is again rotated in the movable supports and any vibration produced is availed of as before described for securing another indication of where weight should be added or removed. This operation is repeated until no vibration, or one within permissible limits, at a predetermined speed as shown by the revolution indicator, is secured. If the rotor be sufficiently balanced as it comes from the shop, no undue vibration will be produced upon rotating it in this apparatus at the predetermined speed and it will need no further adjustment. It will be seen that with a rotor very much unbalanced, the vibration will be stronger, and hence the cushions 12 can be under greater compression than when the rotor is approximately balanced, since a perfectly balanced rotor would have no vibration and exert no lateral force on the bearings whatever, even though they were free to vibrate.

From the foregoing description, it will be seen that according to the method of this invention, the rotor or whatever body is to be balanced is mounted so as to permit a bodily movement while being rotated, and this bodily movement is utilized for making indications at points of eccentricity which thereby determine where the weight is to be varied. The advantages of using an electric motor, with its capacity for wide range of control in either direction, will be apparent, as compared with the balancing of a rotor after being put in the casing.

While I have described the invention with particular reference to rotors for turbines, it will be understood that the method is applicable to the balancing of other rotatable elements as well, and that the apparatus herein described can be varied in many respects without departing from the scope of the invention.

Having thus described my invention, what I claim as new and desire to secure by Letters Patent, is:

The combination with a plurality of U-shaped supports having spaced bridge pieces connecting the upright portions, of a link on each support held between said bridge pieces and pivoted at the base of the support, a separable bearing hanger carried by the end of each link, and adjustable resilient abutments mounted between the link and the upright portion of each support.

In testimony whereof I affix my signature, in presence of two witnesses.

JOHN F. METTEN.

Witnesses:
  I. ARROTT,
  ROLAND L. HOWE.

---

It is hereby certified that in Letters Patent No. 1,047,677, granted December 17, 1912, upon the application of John F. Metten, of Philadelphia, Pennsylvania, for an improvement in "Apparatus for the Balancing of Rotatable Bodies," errors appear in the printed specification requiring correction as follows: Page 1, line 103, for the word "bolt" read *belt*; and that the said Letters Patent should be read with this correction therein that the same may conform to the record of the case in the Patent Office.

Signed and sealed this 3rd day of June, A. D., 1913.

[SEAL.]

C. C. BILLINGS,
*Acting Commissioner of Patents.* to vibrate bodily in its movable supports, on the pivot 2 and against the opposition of the elastic abutments 12. The speed of rotation is made such that a distinct vibration is produced and the pencil or other marking devices 25 are so adjusted that the shaft is marked at points of eccentricity. The point upon the shaft at which the mark is made at ordinary speeds is approximately in the radius containing the excess weight which causes the vibration. The unbalanced portion having been thus determined, it will be apparent that the condition of balance may be approached by removing weight from the rotor upon the side of the axis where the mark is located, or by increasing the weight upon the opposite side, either operation tending to shift the dynamic center of mass closer to the axis of rotation. When they are coincident balance is of course attained. Weight having been added or subtracted as described, the rotor is again rotated in the movable supports and any vibration produced is availed of as before described for securing another indication of where weight should be added or removed. This operation is repeated until no vibration, or one within permissible limits, at a predetermined speed as shown by the revolution indicator, is secured. If the rotor be sufficiently balanced as it comes from the shop, no undue vibration will be produced upon rotating it in this apparatus at the predetermined speed and it will need no further adjustment. It will be seen that with a rotor very much unbalanced, the vibration will be stronger, and hence the cushions 12 can be under greater compression than when the rotor is approximately balanced, since a perfectly balanced rotor would have no vibration and exert no lateral force on the bearings whatever, even though they were free to vibrate.

From the foregoing description, it will be seen that according to the method of this invention, the rotor or whatever body is to be balanced is mounted so as to permit a bodily movement while being rotated, and this bodily movement is utilized for making indications at points of eccentricity which thereby determine where the weight is to be varied. The advantages of using an electric motor, with its capacity for wide range of control in either direction, will be apparent, as compared with the balancing of a rotor after being put in the casing.

While I have described the invention with particular reference to rotors for turbines, it will be understood that the method is applicable to the balancing of other rotatable elements as well, and that the apparatus herein described can be varied in many respects without departing from the scope of the invention.

Having thus described my invention, what I claim as new and desire to secure by Letters Patent, is:

The combination with a plurality of U-shaped supports having spaced bridge pieces connecting the upright portions, of a link on each support held between said bridge pieces and pivoted at the base of the support, a separable bearing hanger carried by the end of each link, and adjustable resilient abutments mounted between the link and the upright portion of each support.

In testimony whereof I affix my signature, in presence of two witnesses.

JOHN F. METTEN.

Witnesses:
I. ARROTT,
ROLAND L. HOWE.

---

It is hereby certified that in Letters Patent No. 1,047,677, granted December 17, 1912, upon the application of John F. Metten, of Philadelphia, Pennsylvania, for an improvement in "Apparatus for the Balancing of Rotatable Bodies," errors appear in the printed specification requiring correction as follows: Page 1, line 103, for the word "bolt" read *belt;* and that the said Letters Patent should be read with this correction therein that the same may conform to the record of the case in the Patent Office.

Signed and sealed this 3rd day of June, A. D., 1913.

[SEAL.]

C. C. BILLINGS,

*Acting Commissioner of Patents.*

It is hereby certified that in Letters Patent No. 1,047,677, granted December 17, 1912, upon the application of John F. Metten, of Philadelphia, Pennsylvania, for an improvement in "Apparatus for the Balancing of Rotatable Bodies," errors appear in the printed specification requiring correction as follows: Page 1, line 103, for the word "bolt" read *belt;* and that the said Letters Patent should be read with this correction therein that the same may conform to the record of the case in the Patent Office.

Signed and sealed this 3rd day of June, A. D., 1913.

[SEAL.]

C. C. BILLINGS,

*Acting Commissioner of Patents.*